United States Patent
Engalitcheff, Jr.

[15] 3,700,110
[45] Oct. 24, 1972

[54] FLUID STRAINER

[72] Inventor: John Engalitcheff, Jr., Gibson Island, Md.

[73] Assignee: Baltimore Aircoil Company, Inc., Jessup, Md.

[22] Filed: July 14, 1971

[21] Appl. No.: 162,557

[52] U.S. Cl..................................210/308, 210/450
[51] Int. Cl.........................B01d 35/16, B01d 27/00
[58] Field of Search........55/498, 525; 210/437, 450, 210/457, 497, 499, 308, 313

[56] References Cited

UNITED STATES PATENTS

| | | | |
|---|---|---|---|
| 354,930 | 12/1886 | Pike | 210/438 |
| 661,373 | 11/1900 | Jandus | 210/450 |
| 796,266 | 8/1905 | Sutton | 210/450 |
| 1,157,934 | 10/1915 | Gehrke | 210/349 |
| 2,583,522 | 1/1952 | Winslow | 210/451 X |
| 2,658,622 | 11/1953 | Thornhill | 210/451 X |
| 2,877,852 | 3/1959 | Bashara | 210/457 X |
| 3,000,505 | 9/1961 | Scavuzzo | 210/457 X |
| 3,353,678 | 11/1967 | Dragon | 210/313 X |

*Primary Examiner*—Reuben Friedman
*Assistant Examiner*—R. W. Burks
*Attorney*—Michael C. Sudol, Jr. et al.

[57] ABSTRACT

A fluid strainer including an elongated shell having an inlet at one end and connecting with an inner passageway of a filter cartridge mounted axially in the shell resting on resilient "O" rings which seal said filter cartridge in the shell.

8 Claims, 4 Drawing Figures

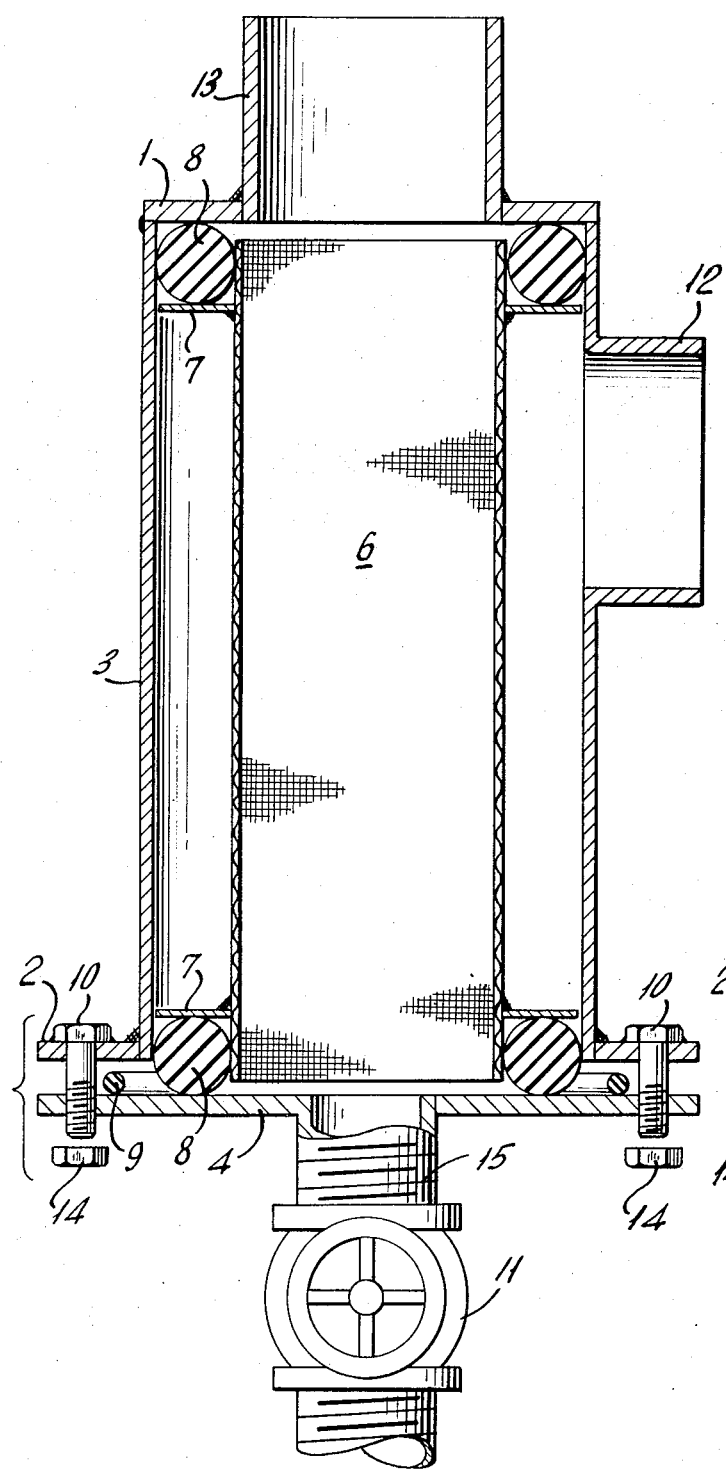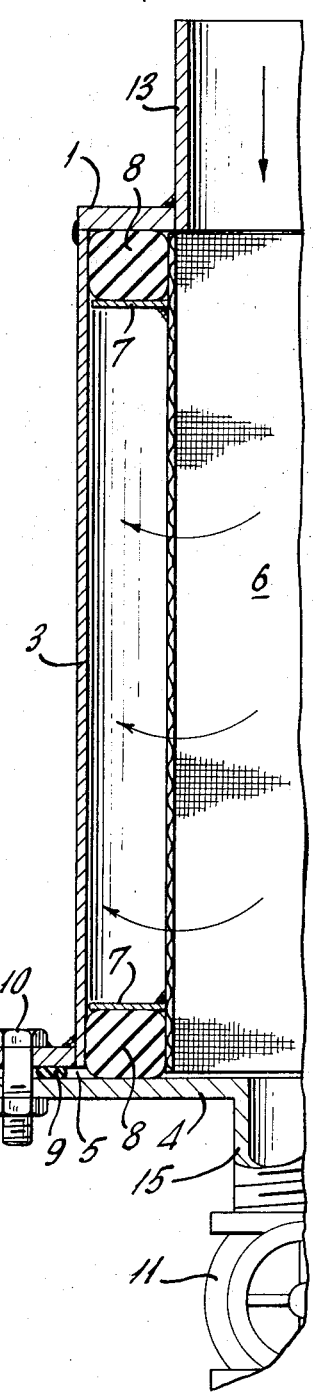
INVENTOR
JOHN ENGALITCHEFF, JR.
BY
Michael C. Seidel, Jr.
ATTORNEY

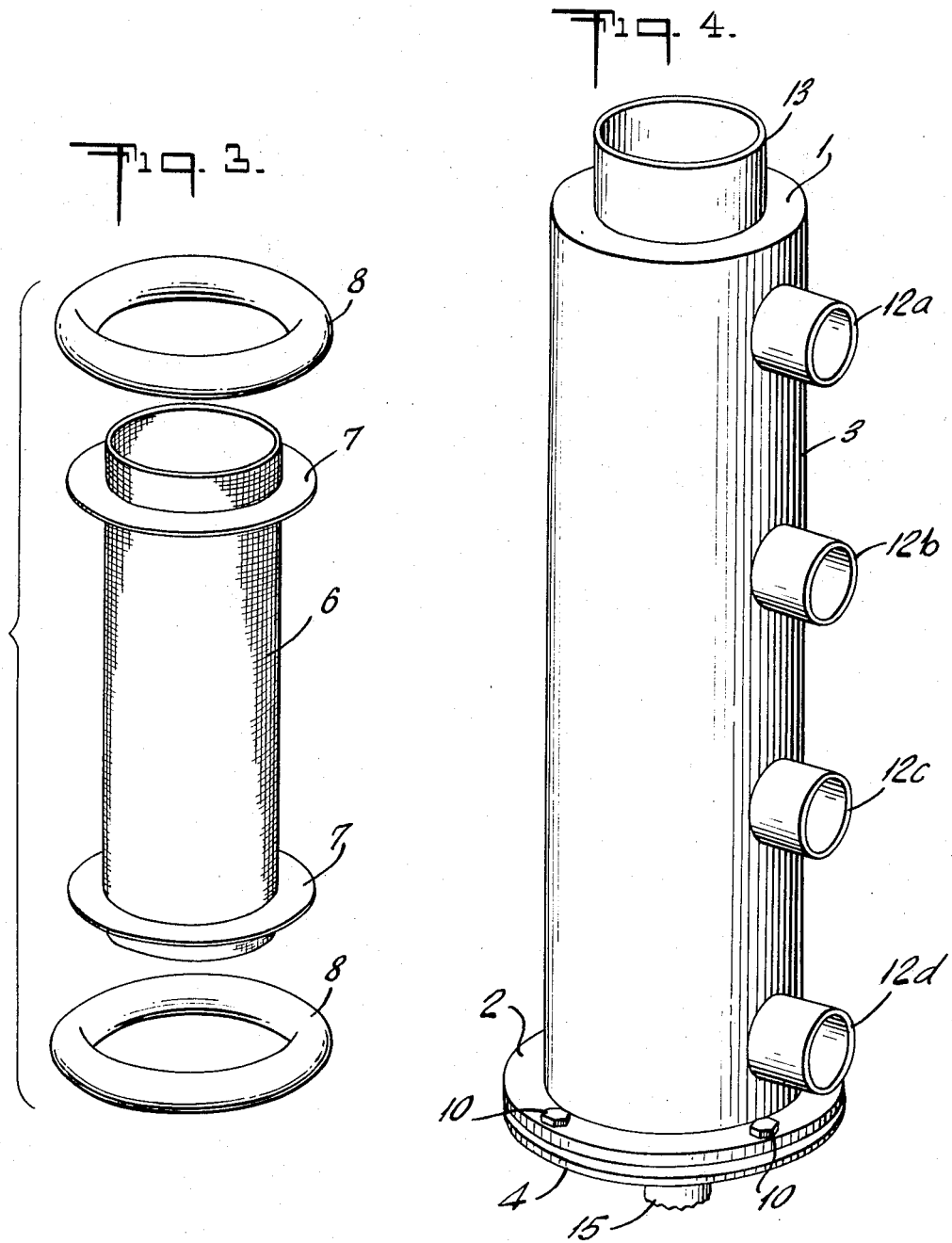

FLUID STRAINER

The invention relates to a pressure filter or strainer which is capable of removing solids or foreign particles from water or other fluids passing therethrough.

Although there are many types of fluid filters or strainers available for removing foreign matter from fluids, but particularly from agricultural or industrial water sources, most of them are only obtainable at a relatively high price compared to applicant's strainer herein described. Also, many of the prior strainers are limited in their usefulness by special mounting requirements, heavy metal construction, and time consuming cleaning procedures.

In addition, the less sophisticated, but also most common and economical type of strainer available, namely, a "Y" type strainer has several deficiencies which applicant's filter does not have. For example, the effective filtration area in the Y-type strainer is less than in applicants' strainer.

It is, therefore, a general object of this invention to provide a strainer which will overcome the above named disadvantages.

Hence, a specific object of this invention is to eliminate the need for expensive machining operations in constructing applicant's strainer. Expensive machining operations are necessary in most strainer designs known to date. Thus, applicant's construction permits fabrication of the fluid strainer from sheet metal stamping and minimizes on the amount and thickness of construction material required.

Additionally, another specific object of the invention is to provide a strainer having a seal between the screening or filtering material and the cartridge or shell, which seal is simple and foolproof in keeping foreign matter from bypassing the filtering screen.

An advantage of applicant's invention is that it provides a strainer which has ample screening area or filtering area and which has a proper flow path for the fluid to be filtered to most effectively use all the available screening or filtering area. Applicant's particular construction of the strainer allows for flexibility in length and size.

Other objects and features of this invention will be apparent in the following description when viewed in conjunction with the accompanying drawings.

FIG. 1 and 2 of the drawings are longitudinal views of a strainer taken through a center plane of the strainer. [FIG. 1 shows the system before it is sealed (i.e., when the "O" rings are uncompressed) and FIG. 2 shows the strainer after being tightly sealed (i.e., when the "O" rings are compressed)].

FIG. 3 is a three-dimensional view of the screening or filtering element including the two stampings and "O" rings and, FIG. 4 is a three-dimensional view of the strainer showing a plurality of water outlets thereon.

Referring now to the FIGURES in more detail — FIG. 1 shows an elongated tubular cylindrical cartridge or shell 3 to which is attached a ring or flange element 2 at the lower end of the cartridge and an upper cover or disc 1 which is attached at the upper end of the cartridge. One way of attaching cover 1 and flange 2 to the upper and lower ends of the cartridge 3 is by welding, but any suitable method of attachment can be used. The cartridge 3 and the cover 1 can even be made in one piece by drawing the metal into the desired shape. Also, it should be realized that the cartridge 3 does not have to be circular in shape as shown in FIG. 1 –2 and 4 but can be hexagonal, square, or other suitable shape.

A cylindrical inlet portion 13 is provided lying concentric with the cover 1 to allow a suitable entrance for the fluid to be strained. The inlet can be formed by a short length of pipe welded in a concentric position to the end closure disc or cover 1. Generally, the diameter of cylindrical inlet 13 while it is lying in a concentric position to the cover 1 is slightly smaller than the diameter of the cylindrical filtering element 6 discussed further on.

Disposed axially inside the cylindrical shell 3 is the filtering element or assembly which extends between the ends of the shell. The filtering element or strainer element 6, can be made from a sheet of perforated metal which is then rolled into a cylindrical shape of predetermined diameter. Depending on the type of solid or foreign matter expected to be filtered, the perforations in the screening material can be chosen to be of a size such as to filter out the solids. The filtering element surrounds and defines an inner flow passageway that extends substantially the entire length of the filter. The filtering element 6 can also be made of a suitable porous material or a wire gauze or screen. The material of which the filtering member is made should, however, be of enough strength to allow the filtering member 6 to be self supporting along its length. The length of the cylindrical filter element 6 is made to be just slightly less than the inside distance between the top plate 1 and cover plate 4 when the latter is bolted in place (see FIG. 2).

In order to provide for a sealing means between the filtering element 6 and the shell 3, relatively light gauge metal flat donut stampings or rings 7 are attached to the outside of the cylindrical filtering element 6 a predetermined distance from each end of said filtering element. This distance is set by the amount of compression of the "O" ring seal that is discussed further on. Additional rings 7 may be provided at intermediate points along the length of the cylindrical filtering element to provide additional strength and support of the filtering element 6 and in the casing or shell 3. These additional rings 7, however, must contain a series of perforations or be opened in some other way so as not to impede the flow of the fluid therethrough. These donut stampings 7 also provide guides to aid in aligning and centering the filtering element 6 in the shell 3. These additional rings 7 will also provide additional strength to the filtering element 6.

A cover plate 4 is provided to be attached to the flange 2 by bolts 10 to be fitted with nuts 14. The bolts can be symmetrically spaced around and securely attached to the flange 2, generally again by welding the bolts to the flange. It should be realized that the bolts do not have to be securely fastened but can be removable also. In order that the cover plate 4 can be easily attached and readily removed from cartridge 3 and flange 2 by hand operation; the nuts 14 can be wing nuts.

The cartridge or shell 3, the cover plate 4, the ring or flange element 2 and the upper cover 1 can be considered to form the housing of the fluid strainer.

The sealing means between the filtering element 6 and the cartridge shell 3 according to my invention are "O" rings 8 placed around the filtering element 6 at each end of the said element located in an annular recess defined on four sides by the cartridge 3, the cover 1 or plate 4, support stampings 7 and filter element 6. These "O" rings are generally made of a closed cell resilient material such as for example neoprene sponge. The inside diameter of each "O" ring should be about the same as the outside diameter of the filtering element 6. The outside diameter of the "O" ring 8 is about the same size as the inside diameter of the cartridge 3.

Furthermore, in order to provide a fluidtight seal, the donut support stampings or rings 7 are attached a predetermined distance from either end of the filter element 6. This distance from the donut support stampings 7 to the cover plate 4 and cover 1 respectively is slightly less than the outside diameter of the cross section of the resilient "O" rings 8 when the nuts 14 are tightened. The effect of this is that when the nuts 14 are tightened, the "O" rings 8 are compressed as shown in FIG. 2 making a tight seal between the shell 3 and filter element 6 at all points. It should be noted from FIG. 1 that the "O" rings 8 lie in an annular cavity defined by four sides named below and when the nuts 14 are loose as in FIG. 1, the "O" rings 8 have four points of contact, namely, those points of the cover plate 4 and cover 1, the shell 3, the donut stampings 7 and the filtering element 6. However, when the nuts 14 are tightened as shown in FIG. 2, the "O" ring is compressed to substantially fill in the void located again between the cover plate 4 and cover 1, shell 3, stamping rings 7 and filtering element 6. Furthermore, although the rings are designated as "O" rings by applicant, one skilled in the art will realize that these can be of a square cross section, a hexagonal cross section, or any other configuration as long as the ring 8 substantially fits in the annular cavity as described.

As a practical matter, the "O" rings 8 make a seal between the shell 3 and filter element 6 to prevent foreign matter in the fluid from passing through the filter element 6. Normally, these "O" rings 8 will also make a fluidtight seal between the shell 3 by way of flange 2 and cover plate 4 but under high pressure another seal 9 at this point will be needed. This seal 9 can be a sealing ring located at space 5. The seal ring 9 which can also be in the form of a flat gasket is formed of a suitable resilient material such as synthetic rubber.

As described above, sealing ring 9 may not be necessary since the seal 8 can perform the same function. This is particularly true if the strainer is operated under low pressure. This sealing ring 9 must be of a size larger than the outside dimension of the shell 3 but smaller than the dimension of the ring of bolts 10.

Flushing means can be connected to the cover plate 4 for direct and rapid discharge of fluid therefrom and for flushing out entrapped foreign matter. Such means can include a fitting 15 on which a valve 11 can be fitted. This arrangement allows the foreign matter collected inside the screen 6 to be flushed to waste without removing the screen for cleaning. Periodically, however, the screen or filtering element 6 should be removed for cleaning. Instead of a valve 11, the fitting 15 can be closed merely by installing a cap thereon and this can be used if desired.

In FIG. 3 there is shown a three-dimensional view of the cylindrical filtering element 6 having attached thereto at a predetermined distance from either end, the donut stampings 7. As stated previously, the stampings 7 can be welded to the filtering element 6 at the appropriate distance from each end. Additional rings or stampings 7, provided they are perforated, can be located anywhere along the longitudinal length of the filtering element 6 to provide additional support as previously discussed. "O" rings 8 are shown in FIG. 3 above and below the appropriate place on the filtering element 6.

It should be noted that the diameter of the cartridge shell 3 or widest point, if the structure of shell 3 is not round in cross section, and length and diameter of the filtering element 6 determine the amount of filter area and flow paths. Other parameters of geometry may determine the flow path if the structure of the strainer is varied from that illustrated above.

In my strainer, the fluid to be filtered is channeled into the strainer through pipe 13 into the shell or cartridge 3. The force of the liquid pressure entering the strainer forces the fluid through the filter screen 6 and out the outlet pipe 12. Any foreign matter in the fluid will be removed by filtering element 6 and fall into the area of the fitting 15. The foreign matter can then be removed periodically by opening valve 11.

A further feature of this strainer is that multiple outlets 12 can be welded to the shell 3 in order to supply a manifold of pipes which may be needed for the particular operation to which filtered fluid must be led. A typical design showing four such outlets (12a, 12b, 12c and 12d) is shown in FIG. 4. In this case, the additional rings 7 need not be perforated as long as they are spaced between adjacent outlets.

It should further be noted, particularly, after referring to FIG. 1 and 2 that there are no machining operations required in order to obtain the necessary particle and fluid seals or even to manufacture the above described fluid strainer. Optimum use of the material used in manufacturing the said strainer is achieved as the upper cover 1 can be the center punched out of the flange piece 2. Both the cover 1 and flange 2 can then be attached to the cartridge 3 in the appropriate positions. The reinforcing characteristics obtained from attaching the cover 1 and flange 2 to the main cartridge or shell 3 as well as the round shape of the shell 3 minimize the thickness of material required for the shell 3 and the plate 4.

The above description of the fluid strainer is deemed to be an illustration of the invention thereof and should not be considered as a limitation of the invention. For example, an embodiment of my invention wherein the outlet 12 can be located along the periphery of the cover 1 is one such illustration. In order to realize this embodiment, however, there must be an open space to provide for these outlets between the outer dimension of the "O" ring and the shell 3. Thus, the "O" ring must contact a lip or projection instead of the shell. This projection can be perpendicular to the ring 7 and cover 1 and can be attached to either as a support.

What is claimed is:

1. A strainer adapted to be connected to a source of fluid to remove solid particles therefrom comprising
   a. a shell having open ends;

b. a filter element disposed within the shell and extending substantially the entire length thereof, said filter element having at least two rings secured to said element at a predetermined distance from each end of the filter element, each ring having an outside dimension smaller than the inside dimension of the shell, and inside dimensions substantially the same as the dimensions of the filter element;

c. a cover communicating with the inner portion of said filter element closing one end of said shell and forming an inlet at said end adapted to be connected to the source of fluid;

d. a flange concentrically attached to the other end of said shell;

e. a plate assembly having an opening therein communicating with the space within the wall of the filter element for flushing out solids trapped within said filter element;

f. means for attaching and sealing said plate to said flange;

g. outlet means communicating with the outer portion of the filter element;

h. means for creating a seal between the filter element and the shell comprising resilient "O" rings located in the two annular cavities defined on four sides by the filter element, the rings, the shell and the cover and plate assembly respectively, said "O" rings having a cross section dimension slightly larger than one side of the said annular cavity so as to be compressed into said annular cavity and form a fluidtight seal when the plate assembly is securely attached to the flange.

2. A strainer of claim 1 wherein the means for attaching and sealing said plate to said flange are a series of bolts symmetrically spaced on said flange passing through openings on said plate and nuts to tightly draw the plate to the flange and the sealing means is a resilient "O" ring located in the annular cavity defined on four sides by the filter element, the ring, the shell or projection between the ring and plate assembly and the plate assembly, said "O" ring having a cross section dimension slightly larger than one side of the said annular cavity so as to be compressed into said annular cavity.

3. A strainer of claim 1 wherein the means for attaching and sealing said plate to said flange are a series of bolts symmetrically spaced on the said flange passing through openings on said plate and nuts to tightly draw the plate to the flange and the sealing means is a resilient ring having an inside diameter greater than that of the shell but less than that of the theoretical circular line of bolts on the flange.

4. A strainer of claim 1 having a plurality of outlets on the side of the shell, cover or plate assembly.

5. A strainer adapted to be connected to a source of fluid to remove solid particles therefrom comprising a. a shell having open ends;

b. a filter element disposed within the shell and extending substantially the entire length thereof, said filter element having at least two rings secured to said element at a predetermined distance from each end of the filter element, each ring having an outside dimension smaller than the inside dimension of the shell, and inside dimensions substantially the same as the dimensions of the filter element;

c. a cover communicating with the inner portion of said filter element closing one end of said shell and forming an inlet at said end adapted to be connected to the source of fluid;

d. a flange concentrically attached to the other end of said shell;

e. a plate assembly having an opening therein communicating with the space within the wall of the filter element for flushing out solids trapped within said filter element;

f. outlet means communicationg with the outer portion of the filter element g. means for attaching and sealing said plate to said flange comprising a series of bolts symmetrically spaced on said flange, passing through openings on said plate, nuts to tightly draw the plate to the flange, and an "O" ring described in h) below;

h. means for creating a seal without machine joints between the filter element and the shell which comprise resilient "O" rings located in the two annular cavities defined on four sides by the filter element, the rings, the shell and the cover and plate assembly respectively, said "O" rings having a cross section dimension slightly larger than one side of the said annular cavity so as to be compressed into said annular cavity.

6. A strainer adapted to be connected to a source of fluid to remove solid particles therefrom comprising a. a shell having open ends;

b. a filter element disposed within the shell and extending substantially the entire length thereof, said filter element having at least two rings secured to said element at a predetermined distance from each end of the filter element, each ring having an outside dimension smaller than the inside dimension of the shell, and inside dimensions substantially the same as the dimensions of the filter element;

c. a cover communicating with the inner portion of said filter element closing one end of said shell and forming an inlet at said end adapted to be connected to the source of fluid;

d. a flange concentrically attached to the other end of said shell;

e. a plate assembly having an opening therein communicating with the space within the wall of the filter element for flushing out solids trapped within said filter element;

f. outlet means communicating with the outer portion of the filter element;

g. means for attaching and sealing said plate to said flange which comprises a series of bolts symmetrically spaced on the said flange passing through openings on said plate and nuts to tightly draw the plate to the flange and a resilient ring resting between said flange and plate having an inside diameter greater than that of the shell but less than that of the theoretical circular line of bolts on the flange;

h. means for creating a seal without machine joints between the filter element and the shell which comprise resilient "O" rings located in the two annular cavities defined on four sides by the filter element, the rings, the shell and the cover and plate assembly, said "O" rings having a cross section dimension slightly larger than one side of the said annular cavity so as to be compressed into said annular cavity.

7. A strainer adapted to be connected to a source of fluid to remove solid particles therefrom comprising
   a. an elongated cylindrical shell having open ends;
   b. an elongated cylindrical filter element disposed within the shell and extending substantially the entire length thereof, said filter element having at least two circular rings secured to said element at a predetermined distance from each end of the filter element, each ring having an outside diameter slightly smaller than the inside diameter of the shell, and an inside diameter substantially the same as the diameter of the filter element;
   c. a cover communicating with the inner portion of the filter element closing one end of said shell forming an inlet at said end adapted to be connected to the source of fluid;
   d. a flange concentrically attached to the other end of said shell;
   e. a plate assembly having an opening therein communicating with the space within the wall of the filter element for flushing out solids trapped within said filter element;
   f. a series of bolts symmetrically spaced on said flange passing through openings on said plate and nuts to tightly draw the plate to the flange;
   g. means mounted on the side of the shell and communicating through the side of the shell forming a discharge outlet;
   h. resilient "O" rings located in the two annular cavities defined on four sides by the filter element, the rings, the shell and the cover and plate assembly respectively, said "O" rings having a cross section diameter slightly larger than one side of the said annular cavity so as to be compressed into said annular cavity and form a fluidtight seal when the plate assembly is securely attached to the flange.

8. A strainer of claim 7 having additional sealing means between the flange and plate, said sealing means consisting of a ring made of resilient material having an inside diameter greater than that of the shell but less than that of a theoretical circular line of bolts on the flange.

* * * * *